(12) United States Patent
Minami

(10) Patent No.: US 7,303,818 B2
(45) Date of Patent: Dec. 4, 2007

(54) ELECTROPHORETIC PARTICLES, ELECTROPHORETIC DISPERSION LIQUID, AND ELECTROPHORETIC DISPLAY DEVICE

(75) Inventor: Masato Minami, Atsugi (JP)

(73) Assignee: Canon Kabusihi Kaisha, Tokyo (JP)

( * ) Notice: Subject to any disclaimer, the term of this patent is extended or adjusted under 35 U.S.C. 154(b) by 20 days.

(21) Appl. No.: 11/100,589

(22) Filed: Apr. 7, 2005

(65) Prior Publication Data

US 2005/0227155 A1    Oct. 13, 2005

(30) Foreign Application Priority Data

Apr. 13, 2004  (JP)  ............... 2004-117860

(51) Int. Cl.
*B32B 5/16* (2006.01)
(52) U.S. Cl. .................. 428/402; 428/403; 428/404; 428/405; 428/406; 428/407
(58) Field of Classification Search ............... 428/402, 428/403, 404, 405, 406, 407
See application file for complete search history.

(56) References Cited

U.S. PATENT DOCUMENTS

| | | | |
|---|---|---|---|
| 3,612,758 A | 10/1971 | Evans | 178/5.4 R |
| 5,380,362 A | 1/1995 | Schubert | 106/493 |
| 5,914,806 A | 6/1999 | Gordon et al. | 359/296 |
| 6,017,584 A | 1/2000 | Albert et al. | 427/213.3 |
| 6,590,696 B2 | 7/2003 | Yanagisawa et al. | 359/296 |
| 2004/0257330 A1* | 12/2004 | Minami | 345/107 |
| 2005/0267235 A1 | 12/2005 | Minami | 523/201 |
| 2005/0267252 A1 | 12/2005 | Minami | 524/556 |
| 2005/0267263 A1 | 12/2005 | Minami | 525/242 |

FOREIGN PATENT DOCUMENTS

| | | |
|---|---|---|
| JP | 09-500458 | 1/1997 |
| JP | 2002-62545 | 2/2002 |

OTHER PUBLICATIONS

U.S. Appl. No. 10/530,731, filed Apr. 8, 2005.

* cited by examiner

*Primary Examiner*—Leszek Kiliman
(74) *Attorney, Agent, or Firm*—Fitzpatrick, Cella, Harper & Scinto

(57) ABSTRACT

An electrophoretic display device includes an electrophoretic dispersion liquid in which electrophotographic particles are dispersed. Each of the electrophotographic particles has a surface salt structure consisting of an acid-derived anionic group and any one of cationic compounds including a specific imidazolium compound, a specific pyridinium compound, a specific quaternary ammonium compound, and a specific trialkylamine-derived compound.

3 Claims, 4 Drawing Sheets

(a)

(b)

(a)

(b)

ELECTROPHORETIC PARTICLES, ELECTROPHORETIC DISPERSION LIQUID, AND ELECTROPHORETIC DISPLAY DEVICE

FIELD OF THE INVENTION AND RELATED ART

The present invention relates to electrophotographic particles, an electrophoretic dispersion liquid, and an electrophoretic display device using the electrophoretic particles and the electrophoretic dispersion liquid.

In recent years, with development of information equipment, the needs for low-power and thin display devices have grown, so that extensive study and development have been made on display devices fitted to these needs. Of these display devices, liquid crystal display devices have been known and developed actively as a display device capable of meeting the needs by electrically controlling alignment of liquid crystal molecules to change optical characteristic of the liquid crystal and has been brought into the commercial stage.

However, such liquid crystal display devices are accompanied with such problems that they have poor viewability of characters on a picture area due to a viewing angle or reflection light and that an eyestrain problem caused by flickering, low luminance, etc., of a light source is not sufficiently solved.

As one of the display devices, Harold D. Lees et al. (U.S. Pat. No. 3,612,758) have proposed an electrophoretic display device.

In the electrophoretic display device, a multiplicity of electrophoretic particles which are positively charged and colored are dispersed in a space between a pair of substrates, each provided with an electrode, together with an electrophoretic dispersion liquid which is filled in the space and colored a color different from the color of the electrophoretic particles. In the space, a partition wall is formed so that it divides the space into a multiplicity of pixels along a planar direction of the substrates. By forming such a partition wall, it is possible to define the space between the pair of substrates while preventing localization of the electrophoretic particles.

In such an electrophoretic display device, when a positive-polarity voltage is applied to an observer's side electrode and a negative-polarity voltage is applied to an electrode on an opposite side, the positively charged electrophoretic particles are collected so as to cover the opposite side electrode, so that a color identical to the color of the electrophoretic dispersion liquid (dispersion medium) is displayed when the electrophoretic display device is observed from the observers side.

On the other hand, when a negative-polarity voltage is applied to the observer's side electrode and a positive-polarity voltage is applied to the opposite side electrode, the positively charged electrophoretic particles are collected so as to cover the observer's side electrode, so that a color identical to the color of the electrophoretic particles is displayed when the electrophoretic display device is observed from the observer's side.

By performing such a drive of the electrophoretic display device on a pixel-by-pixel basis, any image or character is displayed by a multiplicity of pixels.

In a conventional electrophoretic display device, an electrophoretic dispersion liquid is prepared by adding, e.g., an electrifying agent or a dispersing agent into an insulating dispersion medium to impart a chargeability (electrification characteristic) and a dispersibility to electrophoretic particles. The chargeability of the electrophoretic particles has been considered that it results from creation of zeta potential at particle surface by adsorption of dissociated electrifying agent onto the particle surface. On the other hand, the dispersibility has been considered that it results from steric-exclusion effect by adsorption of the added dispersing agent onto the particle surface.

Japanese Laid-Open Patent Application No. (Tokuhyo Hei) 09-500458 has disclosed such a method that a chargeability and a dispersibility are imparted to pigment particles in an electrophoretic dispersion medium colored with a dye by using yellow pigment particles having an acidic site in combination with a charge control agent having a polymer chain containing a basic group.

Further, Japanese Laid-Open Patent Application No. (Tokkai) 2002-062545 has disclosed such a method that a chargeability and a dispersibility are imparted to particles in an electrophoretic dispersion liquid comprising a hydrocarbon solvent, particles having an acidic group (or a basic group), a basic (or acidic) polymer, and a compound having a nonionic polar group.

As described above, there have been conventionally known that the dispersibility is imparted to the electrophotographic particles by utilizing a salt (principally formed through proton transfer) formed by acid-base interaction between the electrophotographic particles and the additives and that the chargeability is imparted to the electrophotographic particles by dissociating a part of the salt from the formed salt.

Such conventional electrophotographic particles utilizing the dissociation between acid and base or utilizing the electrifying agent have a small degree of dissociation in the insulating solvent, so that a resultant zeta potential is also small. As a result, the conventional electrophotographic particles have accompanied with a problem such that they have failed to respond to a voltage, applied under a low-voltage drive condition, at high speed.

SUMMARY OF THE INVENTION

An object of the present invention is to provide electrophotographic particles capable of responding to a voltage, at high speed, applied thereto under a low-voltage drive condition.

Another object of the present invention is to provide an electrophoretic dispersion liquid containing the electrophotographic particles and an electrophoretic display device using the electrophoretic dispersion liquid.

The present invention has been accomplished by finding electrophotographic particles which are excellent in dissociation characteristic and zeta potential characteristic compared with the conventional electrophotographic particles utilizing the acid-base dissociation or the electrifying agent.

According to an aspect of the present invention, there is provided electrophoretic particles, each of which has a salt at a surface thereof, said salt comprising an acid-derived anionic group and any one of cationic compounds represented by the following formulas (1) to (4):

Formula (1):

wherein R1 and R2 independently denote a linear or branched alkyl group having 1-18 carbon atoms;

Formula (2):

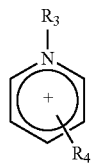

wherein R3 denotes a linear or branched alkyl group having 4-18 carbon atoms, and R4 denotes a linear or branched alkyl group having 1-18 carbon atoms;

Formula (3):

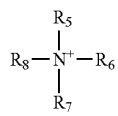

wherein R5, R6, R7 and R8 independently denote a linear or branched alkyl group having 6-18 carbon atoms; and Formula (4):

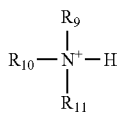

wherein R9, R10 and R11 independently denote a linear or branched alkyl group having 4-18 carbon atoms.

According to another aspect of the present invention, there is provided an electrophoretic dispersion liquid, comprising: the electrophotographic particles described above, and an insulating solvent in which the electrophotographic particles are dispersed.

According to a further aspect of the present invention, there is provided an electrophoretic display device, comprising: a pair of substrates, and the electrophoretic dispersion liquid described above disposed between the pair of substrates.

Each of the electrophotographic particles according to the present invention has an acidic group at least at a surface thereof and has such a structure that a salt is formed between the acidic group and any one of the above described compounds represented by the formulas (1) to (4). The resultant salt has a higher dissociation characteristic than the conventionally used acid-base salts, the electrifying agent, etc. As a result, a charging performance is improved to considerably improve a response speed of the electrophotographic particles, so that it is possible to provide the electrophotographic particles capable of responding to the applied voltage at high speed under a low-voltage drive condition and also provides the electrophoretic dispersion liquid containing the electrophotographic particles and the electrophoretic display device using the electrophoretic dispersion liquid.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
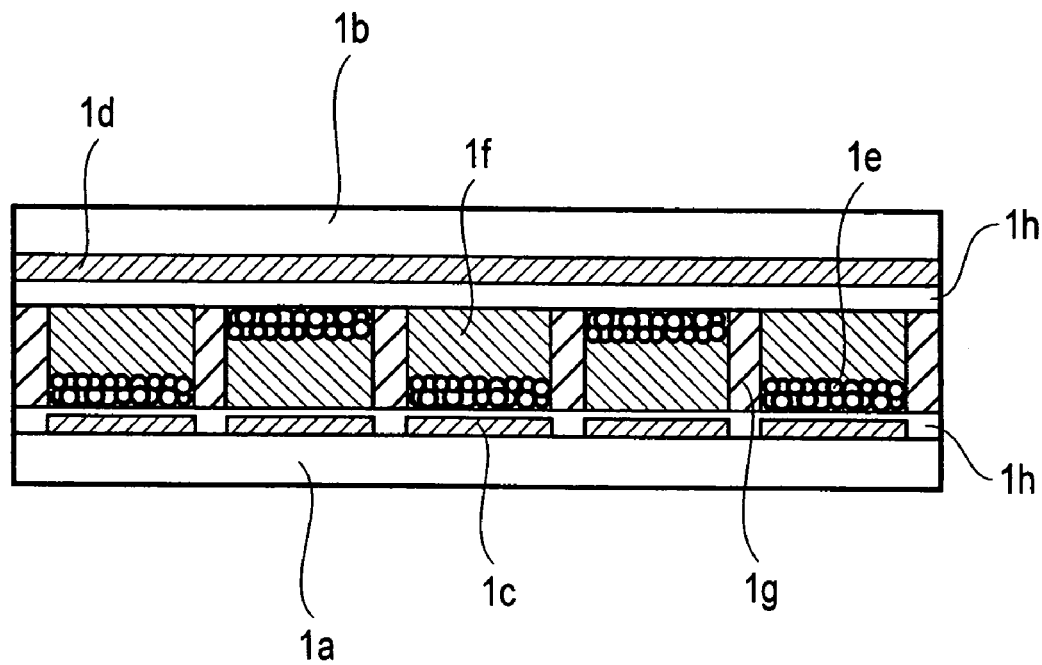
FIGS. 1(a) and 1(b) are schematic sectional views showing an embodiment of an electrophoretic display device using electrophoretic particles of the present invention.
Figure 1:
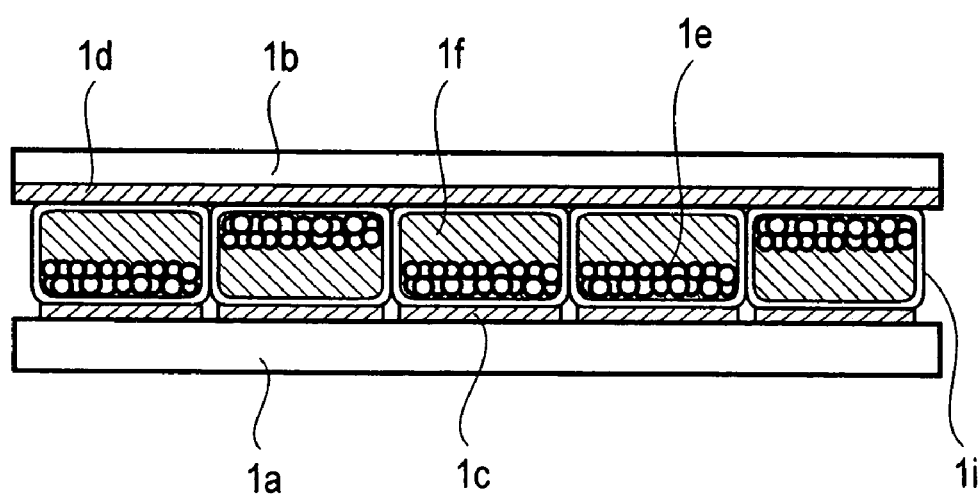

Hereinbelow, preferred embodiments of the present invention will be described in detail with reference to the drawings.

FIGS. 1(a) and 1(b) are schematic sectional views each showing an embodiment of an electrophoretic display device using electrophoretic particles according to the present invention.

Referring to FIG. 1(a), the electrophoretic display device includes a first substrate 1a provided with a first electrode 1c, a second substrate 1b provided with a second electrode 1d, and a partition wall 1g disposed so that the first and second substrates 1 and 2 are oppositely disposed with a predetermined spacing.

In a cell (space) defined by the first and second substrates 1a and 1b and the partition wall 1g, an electrophoretic dispersion liquid which at least comprises a plurality of electrophoretic particles 1e and an electrophoretic dispersion medium 1f. On each of the first and second electrodes, an insulating layer 1h is formed. A display surface of the electrophoretic display device is located on the second substrate 1b side.

FIG. 1(b) shows an electrophoretic display device using microcapsules. On a first substrate 1a, a plurality of microcapsules 1i each containing the electrophoretic dispersion liquid are disposed and covered with a second substrate 1b. In the case of using the microcapsules, an insulating layer 1h may be omitted.

In FIG. 1, the first electrode 1c is a pixel electrode and comprises a plurality of electrode portions which are independently capable of applying a desired electric field to the electrophoretic dispersion liquid in an associated cell (or microcapsule) of the respective cells. The second electrode 1d is a common electrode through which the same electric potential is applied to the entire display area.

The first electrode 1c (pixel electrode) is provided with an unshown switching element (for each electrode portion) and is supplied with a selection signal from an unshown matrix drive circuit row by row and also supplied with a control signal and an output from an unshown drive transistor column by column. As a result, it is possible to apply a desired electric field to the electrophoretic dispersion liquid (electrophoretic particles 1e) in each of the cells groups.

The electrophoretic particles 1e in each individual cell (or microcapsule) are controlled by an electric field applied through the first electrode 1c, whereby at each pixel, the color (e.g., white) of the electrophoretic particles 1e and the color (e.g., blue) of the electrophoretic dispersion medium 1f are selectively displayed. By effecting such a drive on a pixel-by-pixel basis, it is possible to effect display of arbitrary images and characters by use of corresponding pixels.

The first substrate 1a is formed of any insulating member, for supporting the electrophoretic display device, such as glass, plastic, or the like.

The first electrode 1c may be formed of a metal (vapor) deposition film of ITO (indium tin oxide), tin oxide, indium oxide, gold, chromium, etc., in a predetermined pattern through a photolithographic process. The second substrate 1b may comprise an insulating member, such as a transparent glass substrate or a transparent plastic substrate. The second electrode 5 may be a transparent electrode formed of ITO film or an organic electroconductive film.

The insulating layer 1h can be formed of a colorless transparent insulating resin, such as acrylic resin, epoxy resin, fluorine-based resin, silicone resin, polyimide resin, polystyrene resin, or polyalkene resin.

The partition wall 1g can be formed of a polymeric material through, e.g., a method wherein the partition wall is formed with a photosensitive resin through the photolithographic process, a method wherein the partition wall which has been prepared in advance is bonded to the substrate, a method wherein the partition wall is formed through molding, or the like.

The method of filling the electrophoretic dispersion liquid is not particularly limited but can be an ink jet method using nozzles.

The microcapsule 1i containing therein the electrophoretic dispersion liquid described above can be prepared through a known method, such as interfacial polymerization, in situ polymerization, coacervation, or the like.

As a material for the microcapsule 1i, a high light-transmissive material may preferably be used. Examples thereof may include: urea-formaldehyde resin, melamine-formaldehyde resin, polyester, polyurethane, polyamide, polyethylene, polystyrene, polyvinyl alcohol, gelatin, their copolymers, and so on.

The method of forming the microcapsules on the first substrate 1a is not particularly restricted but may be an ink jet method using nozzles.

As the electrophoretic dispersion medium 1f, it is possible to use a liquid, which is high insulative and colorless and transparent, including: aromatic hydrocarbons, such as toluene, xylene, ethylbenzene and dodecylbenzene; aliphatic hydrocarbons, such as hexane, cyclohexane, kerosine, normal paraffin and isoparaffin; halogenated hydrocarbons, such as chloroform, dichloromethane, pentachloroethane, 1,2-dibromoethane, 1,1,2,2-tetraburomoethane, trichloroethylene, tetrachloroethylene, trifluoroethylene and tetrafluoroethylene, various natural or synthetic oils, etc. These may be used singly or in mixture of two or more species.

The electrophoretic dispersion medium 1f may be colored with oil soluble dye having a color of R (red), G (green), B (blue), C (cyan), M (magenta), Y (yellow), etc. Examples of the dye may preferably include azo dyes, anthraquinone dyes, quinoline dyes, nitro dyes, nitroso dyes, penoline dyes, phthalocyanine dyes, metal complex salt dyes, naphthol dyes, benzoquinone dyes, cyanine dyes, indigo dyes, quinoimine dyes, etc. These may be used in combination.

Examples of the oil soluble dye may include Vari Fast Yellow (1101, 1105, 3108, 4120), Oil Yellow (105, 107, 129, 3G, GGS), Vari Fast Red (1306, 1355, 2303, 3304, 3306, 3320), Oil Pink 312, Oil Scarlet 308, Oil Violet 730, Vari Fast Blue (1501, 1603, 1605, 1607, 2606, 2610, 3405). Oil Blue (2N, BOS, 613), Macrolex Blue RR, Sumiplast Gren G, Oil Green (502, BG), etc. A concentration of these dyes may preferably be 0.1-3.5 wt. %, per the electrophoretic dispersion medium 1f.

As the electrophoretic particles 1e used in the present invention, it is possible to use particles each having an acidic group at least at a surface thereof, such as particles comprising a polymer having an acidic group and a pigment dispersed in the polymer, and particles comprising a polymer which has an acidic group and is colored with a dye, etc.

The particles comprising the polymer having the acidic group and the pigment dispersed in the polymer may be obtained by polymerizing an acidic monomer containing the pigment or a basic monomer containing the pigment, e.g., through suspension polymerization, emulsion polymerization, deposition polymerization, dispersion polymerization, etc.

As the polymer having the acidic group used for such particles, it is possible to use homopolymers of acidic monomers, such as (meth)acrylic acid, 2-butenoic acid (crotonic acid), 3-butenoic acid, (vinyl acetate), 3-methyl-3-butenoic acid, 3-pentenoic acid, 4-pentenoic acid, 4-methyl-4-pentenoic acid, 4-hexenoic acid, 5-hexenoic acid, 5-methyl-5-hexenoic acid, 5-heptenoic acid, 6-heptenoic acid, 6-methyl-6-heptenoic acid, 6-octenoic acid, 7-octenoic acid, 7-methyl-7-octenoic acid, 7-nonenoic acid, 8-nonenoic acid, 8-methyl-8-nonenoic acid, 8-decenoic acid, 9-decenoic acid, 3-phenyl-2-propenoic (cinnamic acid), carboxymethyl (meth)acrylate, carboxyethyl (meth)acrylate, vinyl benzoate, vinylphenyl acetate, vinylphenyl propionate, maleic acid, fumaric acid, methylenesuccinic acid (itaconic acid), hydroxystyrene, styrenesulfonic acid, vinyltoluenesulfonic acid, vinylsulfonic acid, sulfomethyl(meth)acrylate, 2-sulfoethyl(meth)acrylate, 2-propene-1-sulfonate, 2-methyl-2-propene-1-sulfonate, and 3-butene-1-sulfonate. It is also possible to use copolymers of the above described acidic monomers with a monomer, such as methyl(meth-)acrylate, ethyl (meth)-acrylate, styrene, p-methyl styrene, p-ethyl styrene, acrylonitrile, etc.

As the pigment, it is possible to use an organic pigment, an inorganic pigment, etc.

Examples of organic pigment may include azo pigments, phthalocyanine pigments, quinacridone pigments, isoindolinone pigments isoindolin pigments, dioxazine pigments, perylene pigments, perinone pigments, thioindigo pigments, quinophthalone pigments, anthraquinone pigments, nitro pigments, and nitroso pigments. Specific examples thereof may include: red pigments, such as Quinacridone Red, Lake Red, Brilliant Carmine, Perylene Red, Permanent Red, Toluidine Red and Madder Lake; green pigments, such as Diamond Green Lake, Phthalocyanine Green, and Pigment Green; blue pigments, such as Victoria Blue Lake, Phthalocyanine Blue, and Fast Sky Blue; yellow pigments, such as Hansa Yellow, Fast Yellow, Disazo Yellow, Isoindolinone Yellow, an Quinophthalone Yellow; and black pigments, such as Aniline Block and Diamond Black.

Examples of the inorganic pigment may include: white pigments, such as titanium oxide, aluminum oxide, zinc oxide, lead oxide, and zinc sulfide; black pigments, such as carbon black, manganese ferrite block, cobalt ferrite black, and titanium black; red pigments, such as cadmium red, red iron oxide, and molybdenum red; green pigments, such as chromium oxide, viridian, titanium cobalt green, cobalt green, and victoria green; blue pigments, such as ultramarine blue, prussian blue, and cobalt blue; and yellow pigments, such as cadmium yellow, titanium yellow, yellow iron oxide, chrome yellow, and antimony yellow.

As the particles comprising the polymer, having the acidic group, colored with a dye, it is possible to use, e.g., particles comprising polymer particles, having the acidic group, colored with a dye or particles obtained through polymerization of an acidic monomer containing a dye. The dye is not particularly limited so long as it is not soluble in the electrophoretic dispersion medium $1f$. In order to obtain the polymer having the acidic monomer, it is possible to use the monomer materials described above therefor.

The electrophotographic particles $1e$ are obtained by causing such particles having the acidic group to react with a halide or hydroxide of the compounds represented by the structural formulas (1) to (3) or with a trialkylamine represented by the structural formula (5). Here, the acidic group means sulfonic group or carboxyl group.

Electrophotographic particles each having an imidazolium salt are prepared from electrophotographic particles each having sulfonic group and the halide compound of the imidazolium ion of the structural formula (1) according to the following chemical reaction formula (1):

Chemical Reaction Formula (1)

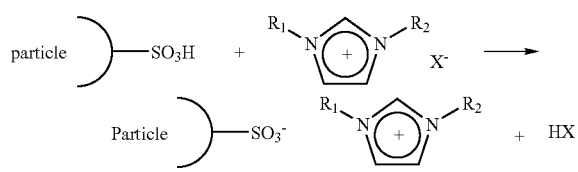

A reaction solvent is not particularly limited but may preferably be alcohol, such as methanol or ethanol.

In the chemical formula (1), $X^-$ represents halogen ion.

In the structural formula (1) shown below representing the imidazolium ion, each of R1 and R2 is a linear or branched alkyl group having 1-18 carbon atoms and may be the same or different from each other.

Formula (1):

Examples of a preferred imidazolium ion may include 1-hexyl-3-methylimidazolium ion (R1=methyl, R2=n-hexyl), 1-octyl-3-methylimidazolium ion (R1=methyl, R2=n-octyl), 1-decyl-3-methylimidazolium ion (R1=methyl, R2=n-decyl), 1-dodecyl-3-methylimidazolium ion (R1=methyl, R2=n-dodecyl), 1-tetradecyl-3-methylimidazolium ion (R1=methyl, R2=n-tetradecyl), 1-hexadecyl-3-methylimidazolium ion (R1=methyl, R2=n-hexadecyl), 1-octadecyl-3-methylimidazolium ion (R1=methyl, R2=n-octadecyl), ethylimidazolium ion (R1=ethyl, R2=n-hexyl), 1-octyl-3-methylimidazolium ion (R1=methyl, R2=n-octyl), 1-decyl-3-methylimidazolium ion (R1=ethyl, R2=n-decyl), 1-dodecyl-3-methylimidazolium ion (R1=ethyl, R2=n-dodecyl), 1-tetradecyl-3-methylimidazolium ion (R1=ethyl, R2=n-tetradecyl), 1-hexadecyl-3-methylimidazolium ion (R1=ethyl, R2=n-hexadecyl), 1-octadecyl-3-methylimidazolium ion (R1=ethyl, R2=n-octadecyl).

Electrophotographic particles each having a pyridinium salt are prepared from electrophotographic particles each having sulfonic group and the halide compound of the pyridinium ion of the structural formula (2) according to the following chemical reaction formula (2):

Chemical Reaction Formula (2)

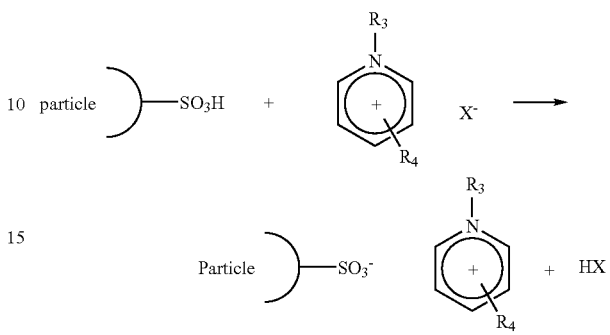

A reaction solvent is not particularly limited but may preferably be the alcohol described above.

In the chemical formula (2), $X^-$ represents halogen ion.

In the structural formula (2) shown below representing the pyridinium ion, R3 is a linear or branched alkyl group having 4-18 carbon atoms and R4 is a linear or branched alkyl group having 1-18 carbon atoms.

Formula (2):

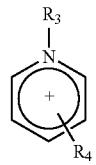

Examples of a preferred pyridinium ion may include: N-butylpyridinium ion (R3=n-butyl, R4=hydrogen), N-hexylpyridinium ion (R3=n-hexyl, R4=hydrogen), N-octylpyridinium ion (R3=n-octyl, R4=hydrogen), N-decylpyridinium ion (R3=n-decyl, R4=hydrogen), N-dodecylpyridinium ion (R3=n-dodecyl, R4=hydrogen), N-tetradecylpyridinium ion (R3=n-tetradecyl, R4=hydrogen), N-hexadecylpyridinium ion (R3=n-hexadecyl, R4=hydrogen), N-octadecylpyridinium ion (R3=n-octadecyl, R4=hydrogen), N-butyl-3-butylpyridinium ion (R3=R4=n-butyl), N-hexyl-3-butylpyridinium ion (R3=n-hexyl, R4=n-butyl), N-octyl-3-butylpyridinium ion (R3=n-octyl, R4=n-butyl), N-decyl-3-butylpyridinium ion (R3=n-decyl, R4=n-butyl), N-dodecyl-3-butylpyridinium ion (R3=n-dodecyl, R4=n-butyl), N-tetradecyl-3-butylpyridinium ion (R3=n-tetradecyl, R4=n-butyl), N-hexadecyl-3-butylpyridinium ion (R3=n-hexadecyl, R4=n-butyl), and N-octadecyl-3-butylpyridinium ion (R3=n-octadecyl, R4=n-butyl).

Electrophotographic particles each having a quaternary ammonium salt are prepared from electrophotographic particles each having sulfonic group and the halide or hydroxide compound of the quaternary ammonium ion of the structural formula (3) according to the following chemical reaction formula (3):

Chemical Reaction Formula (3)

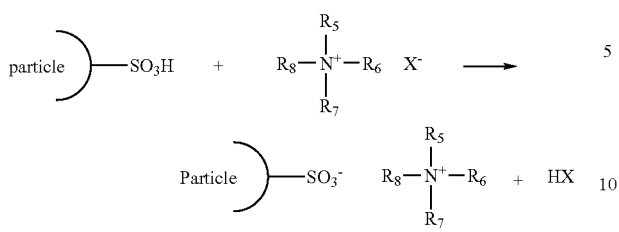

A reaction solvent is not particularly limited but may preferably be the alcohol described above.

In the chemical formula (3), $X^-$ represents halogen ion or hydroxide ion.

In the structural formula (3) shown below representing the quaternary ammonium ion, each of R5, R6, R7 and R8 is a linear or branched alkyl group having 6-18 carbon atoms and may be the same or different from each other.

Formula (3):

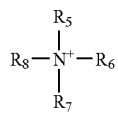

Examples of a preferred quaternary ammonium ion may include: tetra(n-octyl)ammonium ion (R5=R6=R7=R8=n-octyl), tetra(n-decyl)ammonium ion (R5=R6=R7=R8=n-decyl), tetra(n-dodecyl)ammonium ion (R5=R6=R7=R8=n-dodecyl), tetra(n-tetradecyl) ammonium ion (R5=R6=R7=R8=n-tetradecyl), tetra (n-hexadecyl)ammonium ion (R5=R6=R7=R8=n-hexadecyl), trimethyldecylammonium ion (R5=n-decyl, R6=R7=R8=methyl), trimethyldodecylammonium ion (R5=n-dodecyl, R6=R7=R8=methyl), trimethyl-tetradecylammonium ion (R5=n-tetradecyl, R6=R7=R8=methyl), trimethylhexadecylammonium ion (R5=n-hexadecyl, R6=R7=R8=methyl), and trimethyloctadecylammonium ion (R5=n-octadecyl, R6=R7=R8=methyl).

Electrophotographic particles each having a tertiary ammonium salt are prepared from electrophotographic particles each having sulfonic group and the trialkylamine of the structural formula (5) according to the following chemical reaction formula (4):

Chemical Reaction Formula (4)

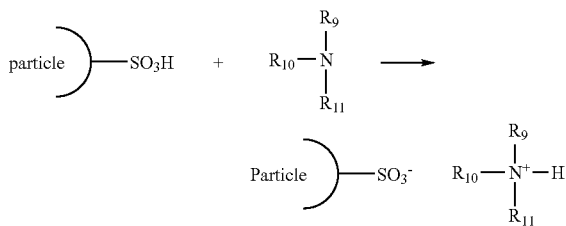

A reaction solvent is not particularly limited but may preferably be alcohol, such as methanol or ethanol.

In the structural formula (5) shown below representing the trialkylamine ion, each of R9, R10 and R11 is a linear or branched alkyl group having 4-18 carbon atoms and may be the same or different from each other.

Formula (5):

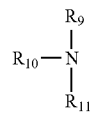

Examples of a preferred trialkylamine may include: tri(n-butyl)amine (R9=R10=R11=n-butyl), tri(t-butyl)amine (R9=R10=R11=t-butyl), tri(iso-butyl)amine (R9=R10=R11=iso-butyl), tri(2-methylbutyl)amine (R9=R10=R11=2-methylbutyl), tri(2-ethylbutyl)amine (R9=R10=R11=2-ethylbutyl), tri(n-pentyl)amine (R9=R10, R11=n-pentyl), tri(n-hexyl)amine (R9=R10=R11=n-hexyl), tri(2-ethylhexyl)amine (R9=R10=R11=2-ethylhexyl), tri(n-octyl)amine (R9=R10=R11=n-octyl), and tri(n-decyl)amine (R9=R10=R11=n-decyl).

The above described electrophotographic particles 1e of the present invention have excellent dissociation characteristic in the insulating electrophoretic dispersion medium 1f. More specifically, the electrophotographic particles 1e have a degree of dissociation which is several times to about 90 times that of zirconium octoate which has been ordinarily used conventionally.

The electrophotographic particles 1e may preferably have an average particle size of 50 nm to 10 μm, more preferably 300 nm to 2 μm. When the average particle size exceeds 10 μm, display at high resolution cannot be performed. When the average particle size is less than 50 nm, there arises an undesirable problem in terms of dispersion stability due to agglomeration of the particles.

The electrophotographic particles 1e may preferably have a concentration of 1-40 wt. %, more preferably 3-20 wt. %, per the weight of the electrophoretic dispersion medium 1f. When the electrophotographic particles have the concentration of less than 1 wt. %, a display contrast of the electrophotographic particles 1e is undesirably lowered. When the concentration of the electrophotographic particles exceeds 40 wt. %, a display contrast of the colored electrophoretic dispersion medium 1f is undesirably lowered.

With respect to dispersibility of the electrophotographic particles 1e in the electrophoretic dispersion medium 1f, it is possible to impart the dispersibility to the electrophotographic particles 1e by adding therein a dispersion stabilizer or introducing a steric hindrance group into the electrophotographic particles.

As the dispersion stabilizer, it is possible to use a homopolymer, a copolymer, a block polymer, etc. Examples thereof may include: polyvinyl pyrrolidone, polyvinyl methyl ether, (styrene-vinylpyridine) copolymer, (styrene-butadiene)-copolymer, etc.

As the steric hindrance group, it is possible to use a monomer, examples of which may include: 2-ethylhexyl (meth-)acrylate, octyl (meth-)acrystal, decyl(meth-)acrylate, dodecyl (meth-)acrylate, tetradecyl(meth-)acrylate, hexadecyl (meth-)acrylate, octadecyl(meth-)acrylate, butadiene, isoprene, isobutene, pentene, hexene, etc. The steric hindrance group can be introduced onto the electrophotographic particles 1e by copolymerization thereof with the acidic monomer described above.

Figure 2:
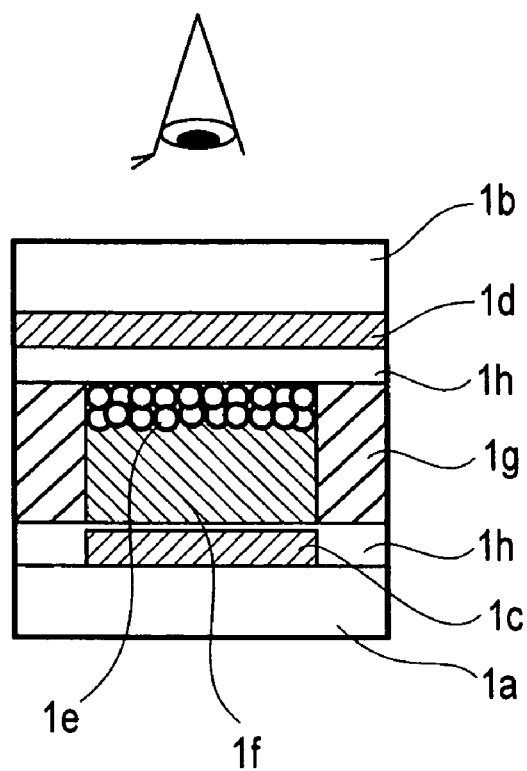
FIGS. 2(a) and 2(b) are schematic views showing a display example of the electrophoretic display device.
Figure 2:
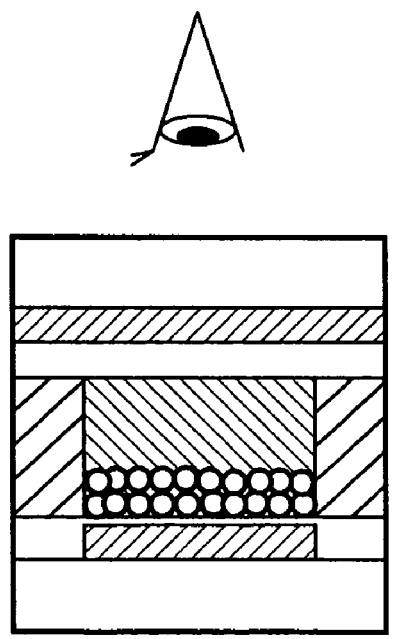

A display example of the electrophoretic display device using the electrophotographic particles of the present invention i shown in FIGS. 2(a) and 2(b), wherein an EDL comprising white electrophotographic particles 1e and an electrophoretic dispersion medium 1f colored with a blue dye is filled in a cell. In these figures, the electrophotographic particles 1e are negatively charged by dissociation of the salt. When the second electrode 1d is 0 V and the first electrode 1c is supplied with a voltage of a negative polarity, the electrophotographic particles 1e are collected to the second electrode 1d. As a result, when the cell is viewed from above, the cell looks white due to distribution of the white electrophotographic particles 1e. On the other hand, when the second electrode 1d is 0 V and the first electrode 1c is supplied with a voltage of a positive polarity, the electrophotographic particles 1e are collected to the first electrode 1c. As a result, when the cell is viewed from above, the cell looks blue. By carrying out such a drive on a pixel-by-pixel basis, it is possible to display arbitrary image and character at a multiplicity of pixels.

Hereinbelow, another embodiment of an electrophoretic display device using electrophoretic particles of the present invention will be described with reference to the drawings.

Figure 4:
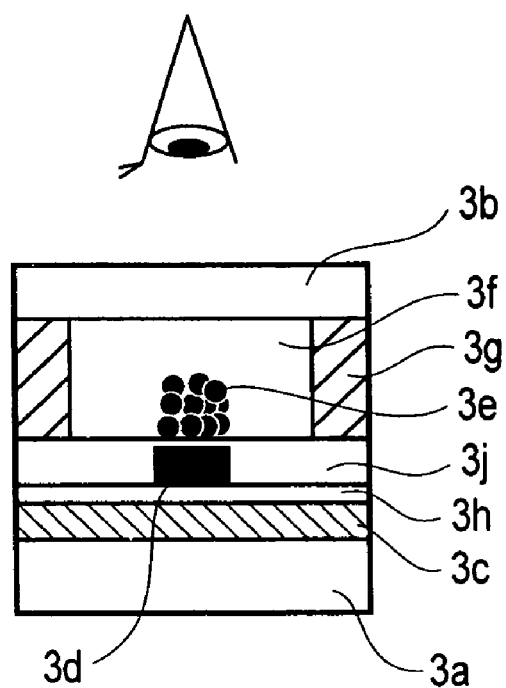
FIGS. 4(a) and 4(b) are schematic views showing a display example of the electrophoretic display device of Second Embodiment.
Figure 4:
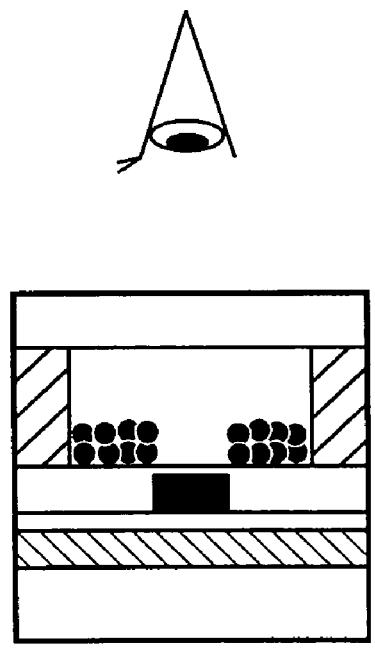

FIGS. 4(a) and 4(b) are schematic sectional views each showing another embodiment of an electrophoretic display device using the electrophotographic particles of the present invention.

As shown in FIG. 4(a), the electrophoretic display device includes a first substrate 3a on which a first electrode 3c and a second electrode 3d are disposed. Between the electrodes 3c and 3d and on the second electrode 3d, an insulating layer 3h and an insulating layer 3i are formed, respectively. The insulating layer 3h formed between the electrodes 3c and 3d may be colored or may be colorless and transparent, but the insulating layer 3i is colorless and transparent.

The electrophoretic display device further includes a second substrate 3b disposed opposite to the first substrate 3a with a spacing through a partition wall 3g. In a cell (space) defined by the pair of first and second substrates 3a and 3b and the partition wall 3g, an electrophoretic dispersion liquid comprising at least electrophoretic particles 3e and an electrophoretic dispersion medium 3f is sealed. A display surface of the electrophoretic display device is located on the second substrate 3b side.

Figure 3:
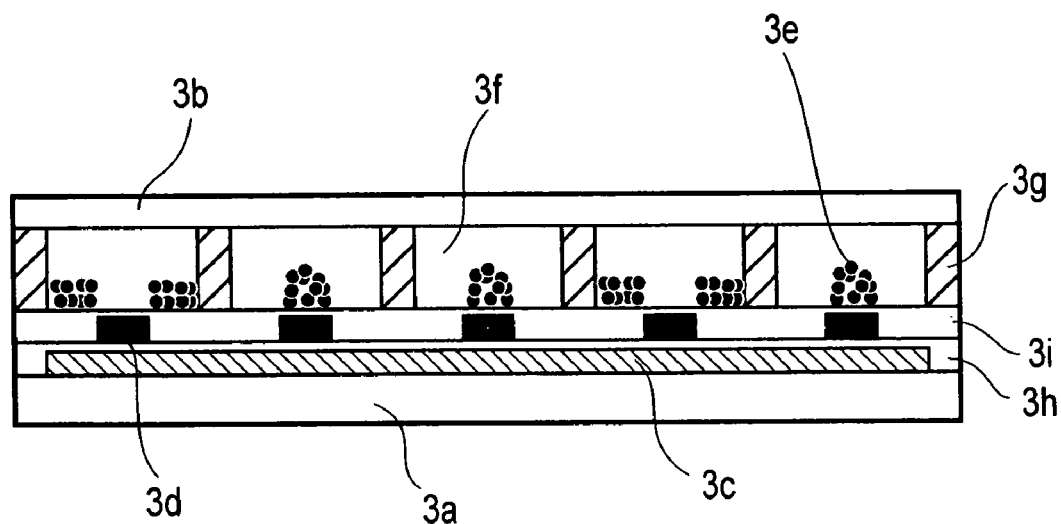
FIGS. 3(a) and 3(b) are schematic sectional views showing another embodiment of an electrophoretic display device using electrophoretic particles of the present invention.
Figure 3:
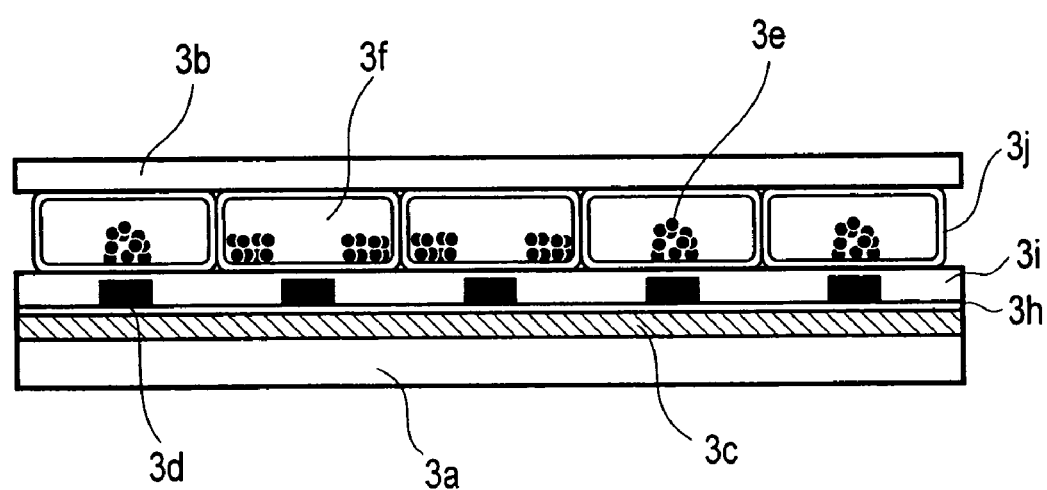

FIG. 3(b) shows an electrophoretic display device using microcapsules. On a first substrate 3a, a plurality of microcapsules 3i each containing the electrophoretic dispersion liquid are disposed and covered with a second substrate 3b. In the case of using the microcapsules, an insulating layer 3i may be omitted.

In FIGS. 3(a) and 3(b), the second electrode 3d comprises a plurality of electrode portions as pixel electrodes capable of independently applying a described electric field to the electrophoretic dispersion liquid in each cell (or each microcapsule), and the first electrode 3c is a common electrode through which the same potential is applied to the entire display area.

The second electrode 3c (pixel electrode) is provided with an unshown switching element (for each electrode portion) and is supplied with a selection signal from an unshown matrix drive circuit row by row and also supplied with a control signal and an output from an unshown drive transistor column by column. As a result, it is possible to apply a desired electric field to the electrophoretic dispersion liquid (electrophoretic particles 3e) in each of the cells groups.

The electrophoretic particles 3e in each individual cell (or microcapsule) are controlled by an electric field applied through the second electrode 3c, whereby at each pixel, the color (e.g., black) of the electrophoretic particles 3e and the color (e.g., white) of the insulating layer 3h are selectively displayed. By effecting such a drive on a pixel-by-pixel basis, it is possible to effect display of arbitrary images and characters by use of corresponding pixels 3.

The first substrate 3a is formed of any insulating member, for supplying the electrophoretic display device, such a glass, plastic, or the like.

The second substrate 3b may be a transparent substrate or a transparent plastic substrate.

The first electrode 3c is a metal electrode of, e.g., Al exhibiting light reflection performance.

The insulating layer 3h formed on the first electrode 3c is formed of a mixture of a transparent colorless insulating resin with light scattering fine particles of, e.g., aluminum oxide or titanium oxide. As a material for the transparent colorless insulating resin, it is possible use the above described insulating resins. Alternatively, it is also possible to use a light scattering method utilizing unevenness at the surface of the metal electrode without using the fine particles.

The second electrode 3d is formed of an electroconductive material, which looks dark black from the viewer side of the electrophoretic display device, such as titanium carbide, black-treated Cr, and Al or Ti provided with a black surface layer. Pattern formation of the second electrode 5 may be performed through a photolithographic process.

On the second electrode 3d, the insulating layer 3i is formed of, e.g., the transparent colorless insulating resin described above.

In this embodiment, a display contrast is largely depend on an areal ratio between the second electrode 3d (each electrode portion) and an associated pixel, so that an exposed area of the second electrode 3d is required to be smaller than that of the pixel in order to enhance a contrast. For this reason, it is preferable that the areal ratio therebetween may ordinarily be 1:2 to 1:5.

The partition wall 3g may be formed in the same manner as described above. The method of filling the above described electrophoretic dispersion liquid in the cell is not limited particularly but may be the above described ink jet method using nozzles.

The microcapsule 3j containing the electrophoretic dispersion liquid can be prepared by the known method as described above, such as interfacial polymerization, in situ polymerization, coacervation, and so on. The material for forming the microcapsule 3j may be the same polymer as described above.

The method of forming the microcapsules 3j on the first substrate 3a is not particularly restricted but may be the above described ink jet method using nozzles.

As the electrophoretic dispersion medium 3f, it is possible to use the above described liquids, and as the electrophoretic particles 3e, it is possible to use the above described particles. In this embodiment, a concentration of the electrophotographic particles 3e may preferably 0.5-10 wt. %, more preferably 1-5 wt. %, per the weight of the electrophoretic dispersion medium 3f. When the concentration of the electrophotographic particles 3e is less than 0.5 wt. %, the first electrode 3c cannot be covered, so that a display contrast is undesirably lowered. Further, when the concentration of the electrophotographic particles 3e exceeds 10 wt. %, the electrophotographic particles extend off the colored second electrode 3d, thus undesirably lowering the display contrast.

A display example of the electrophoretic display device using the electrophoretic particles liquid according to this embodiment is shown in FIGS. 4(a) and 4(b).

FIGS. 4(a) and 4(b) illustrate a display example wherein, e.g., an electrophoretic dispersion liquid comprising black electrophoretic particles 3e and a colorless and transparent electrophoretic dispersion medium 3f is filled in a cell. The electrophoretic particles 3e is negatively charged by the dissociation of the salt.

In the case where the color of the surface of the insulating layer 3a is white and the color of the surface of the second electrode 3d is black, when the electrophoretic particles 3e are collected on the surface of the second electrode 5 as shown in FIG. 4(a) by applying a positive-polarity voltage to the second electrode while keeping the voltage of the first electrode 3c at 0 V, the cell looks white when viewed from above. On the other hand, when the electrophoretic particles 3e are collected on the surface of the first electrode 3c as shown in FIG. 4(b), by applying a negative-polarity voltage to the second electrode while keeping the voltage of the first electrode 3c at 0 V, the cell looks black when viewed from above. By performing such a drive on a pixel-by-pixel basis, it is possible to display an arbitrary image or character by use of a multiplicity of pixels.

Hereinbelow, the present invention will be described more specifically based on Examples but the present invention is not limited thereto.

EXAMPLE 1

A uniform mixture liquid was prepared by mixing 15 g of titanium oxide particles (average particle size: 0.2 μm) which were subjected to hydrophobicity-imparting treatment and 1.7 g of azobisisobutyronitrile (AIBN) (polymerization initiator) in 7 g of methacrylic acid and 130 g of methyl methacrylate. In a dispersion medium comprising 1800 g of a sodium dodecyl sulfonate aqueous solution (concentration: 0.05 wt. %) and 90 g of calcium phosphate dispersed therein, the uniform mixture liquid was added. The resultant liquid was stirred at 10,000 rpm for 15 minutes by a homogenizer to prepare a suspension. Thereafter, the suspension was subjected to polymerization at 80° C. for 7 hours in a nitrogen atmosphere. After the polymerization, the resultant polymer particles were washed, followed by drying and classification to obtain white particles each comprising titanium oxide particle coated with (methacrylic acid-methyl methacrylate) copolymer. An average particle size of the particles was about 2 microns.

With 10 g of the thus obtained particles, 1 g of an imidazolium salt represented by a structural formula (A) shown below was caused to react in methanol, followed by separation and purification to obtain electrophotographic particles 1e each having the imidazolium salt.

Formula (A):

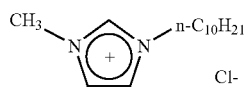

Then, 5 wt. % of the white electrophoretic particles 1e, 2.5 wt. % of styrene-butadiene copolymer as a dispersion stabilizer, and 92.5 wt. % of an electrophoretic dispersion medium 1f comprising isoparaffin (trade name: "Isoper H", mfd. by Exxon Corp.) colored blue with 0.1 wt. % of a colorant ("Oil Blue N", mfd. by Aldrich Co.) dissolved therein, were mixed to prepare an electrophoretic dispersion liquid. The electrophoretic dispersion liquid was injected into a cell by using nozzles according to an ink jet method to provide an electrophoretic display device, as shown in FIG. 1(a), which was connected with a voltage application circuit.

As a result of measurement of electric conductivity, it was confirmed that a degree of dissociation of the imidazolium salt of the electrophotographic particles 1e was about 80 times that of an electrifying agent used in Comparative Example 1 appearing hereinafter, thus resulting in an excellent dissociation characteristic. As a result of the high degree of dissociation of the salt used, it was presumed that a resultant zeta potential was also increased to improve a charging performance.

When the resultant electrophoretic display device was subjected to contrast display by driving it at a low voltage of ±5 V, it was possible to effect clear blue/white display. Further, the electrophotographic particles 1e had a response speed which was about several-ten times that of electrophotographic particles used in Comparative Example 1, so that it was confirmed that the electrophoretic display device was capable of being driven at high response speed.

EXAMPLE 2

A plurality of microcapsules 1i each containing an electrophoretic dispersion liquid prepared in the same manner as in Example 1 were prepared by in-situ polymerization method. Each microcapsule was formed of urea-formaldehyde resin as a film-forming material. An electrophoretic display device shown in FIG. 1(b) was prepared by disposing the plurality of microcapsules 1i on a first substrate 1a by use of nozzles according to the ink jet method. The electrophoretic display device was connected with a voltage application circuit.

As a result of measurement of electric conductivity, it was confirmed that a degree of dissociation of the imidazolium salt of the electrophotographic particles 1e was about 80 times that of an electrifying agent used in Comparative Example 1 appearing hereinafter, thus resulting in an excellent dissociation characteristic.

When the resultant electrophoretic display device was subjected to contrast display by driving it at a low voltage of ±5 V, it was possible to effect clear blue/white display. Further, the electrophotographic particles 1e had a response speed which was about several-ten times that of electrophotographic particles used in Comparative Example 1, so that it was confirmed that the electrophoretic display device was capable of being driven at high response speed.

EXAMPLE 3

Particles of titanium oxide, coated with (methacrylic acid-methyl methacrylate) copolymer, prepared in the same manner as in Example 1 was subjected to two-stage polymerization with 2-ethylhexyl methacrylate to form a core-shell structure wherein a steric hindrance group was introduced into a surface of particle.

With 10 g of the thus obtained particles, 1.2 g of a pyridinium salt represented by a structural formula (B) shown below was caused to react in methanol, followed by separation and purification to obtain electrophotographic particles 1e each having the pyridinium salt.

Formula (B):

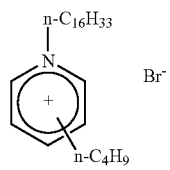

Then, 5 wt. % of the white electrophoretic particles 1e and 95 wt. % of an electrophoretic dispersion medium 1f comprising isoparaffin (trade name: "Isoper H", mfd. by Exxon Corp.) colored blue with 0.1 wt. % of a colorant ("Oil Blue N", mfd. by Aldrich Co.) dissolved therein, were mixed to prepare an electrophoretic dispersion liquid. The electrophoretic dispersion liquid was injected into a cell by using nozzles according to an ink jet method to provide an electrophoretic display device, as shown in FIG. 1(a), which was connected with a voltage application circuit.

As a result of measurement of electric conductivity, it was confirmed that a degree of dissociation of the pyridinium salt of the electrophotographic particles 1e was about 40 times that of an electrifying agent used in Comparative Example 1 appearing hereinafter, thus resulting in an excellent dissociation characteristic.

When the resultant electrophoretic display device was subjected to contrast display by driving it at a low voltage of ±5 V, it was possible to effect clear blue/white display. Further, the electrophotographic particles 1e had a response speed which was about several-ten times that of electrophotographic particles used in Comparative Example 1, so that it was confirmed that the electrophoretic display device was capable of being driven at high response speed.

EXAMPLE 4

A plurality of microcapsules 1i each containing an electrophoretic dispersion liquid prepared in the same manner as in Example 3 were prepared by in-situ polymerization method. Each microcapsule was formed of urea-formaldehyde resin as a film-forming material. An electrophoretic display device shown in FIG. 1(b) was prepared by disposing the plurality of microcapsules 1i on a first substrate 1a by use of nozzles according to the ink jet method. The electrophoretic display device was connected with a voltage application circuit.

As a result of measurement of electric conductivity, it was confirmed that a degree of dissociation of the pyridinium salt of the electrophotographic particles 1e was about 40 times that of an electrifying agent used in Comparative Example 1 appearing hereinafter, thus resulting in an excellent dissociation characteristic.

When the resultant electrophoretic display device was subjected to contrast display by driving it at a low voltage of ±5 V, it was possible to effect clear blue/white display. Further, the electrophotographic particles 1e had a response speed which was about several-ten times that of electrophotographic particles used in Comparative Example 1, so that it was confirmed that the electrophoretic display device was capable of being driven at high response speed.

EXAMPLE 5

A uniform mixture liquid was prepared by mixing 10 g of carbon black particles (average particle size: 30 nm) which were subjected to hydrophobicity-imparting treatment and 1.7 g of azobisisobutyronitrile (AIBN) (polymerization initiator) in 7 g of sodium styrenesulfonate and 130 g of styrene. In a dispersion medium comprising 1800 g of a sodium dodecyl sulfonate aqueous solution (concentration: 0.05 wt. %) and 90 g of calcium phosphate dispersed therein, the uniform mixture liquid was added. The resultant liquid was stirred at 10,000 rpm for 15 minutes by a homogenizer to prepare a suspension. Thereafter, the suspension was subjected to polymerization at 80° C. for 7 hours in a nitrogen atmosphere. After the polymerization, the resultant polymer particles were washed, followed by drying and classification to obtain black particles each comprising carbon black particle coated with (sodium styrene sulfonate-styrene) copolymer. An average particle size of the particles was about 2 microns.

The particles were subjected to acid treatment to convert the sodium sulfonate into sulfonic acid group.

With 10 g of the thus treated particles, 1 g of a quaternary ammonium salt represented by a structural formula (C) shown below was caused to react in methanol, followed by separation and purification to obtain electrophotographic particles 3e each having the quaternary ammonium salt.

Formula (C):

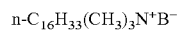

In the present invention, however, the quaternary ammonium salt of the structural formula (7) may be caused to react with the particles without converting the sodium sulfonate into the sulfonic acid group to obtain electrophotographic particles 3 each having the quaternary ammonium salt.

Then, 1 wt. % of the black electrophoretic particles 3e, 0.5 wt. % of styrene-butadiene copolymer as a dispersion stabilizer, and 98.5 wt. % of an electrophoretic dispersion medium 3f comprising isoparaffin (trade name: "Isoper H", mfd. by Exxon Corp.) were mixed to prepare an electrophoretic dispersion liquid. The electrophoretic dispersion liquid was injected into a cell by using nozzles according to an ink jet method to provide an electrophoretic display device, as shown in FIG. 3(a), which was connected with a voltage application circuit.

As a result of measurement of electric conductivity, it was confirmed that a degree of dissociation of the imidazolium salt of the electrophotographic particles 3e was about 28 times that of an electrifying agent used in Comparative Example 2 appearing hereinafter, thus resulting in an excellent dissociation characteristic. As a result of the high degree of dissociation of the salt used, it was presumed that a resultant zeta potential was also increased to improve a charging performance.

When the resultant electrophoretic display device was subjected to contrast display by driving it at a low voltage of ±5 V, it was possible to effect clear black/white display. Further, the electrophotographic particles 3e had a response speed which was about several-ten times that of electrophotographic particles used in Comparative Example 2, so that it was confirmed that the electrophoretic display device was capable of being driven at high response speed.

EXAMPLE 6

A plurality of microcapsules 3i each containing an electrophoretic dispersion liquid prepared in the same manner as in Example 5 were prepared by in-situ polymerization method. Each microcapsule was formed of polyamide resin as a film-forming material. An electrophoretic display device shown in FIG. 3(b) was prepared by disposing the plurality of microcapsules 3i on a first substrate 3a by use of nozzles according to the ink jet method. The electrophoretic display device was connected with a voltage application circuit.

As a result of measurement of electric conductivity, it was confirmed that a degree of dissociation of the quaternary ammonium salt of the electrophotographic particles 3e was about 28 times that of an electrifying agent used in Comparative Example 2 appearing hereinafter, thus resulting in an excellent dissociation characteristic.

When the resultant electrophoretic display device was subjected to contrast display by driving it at a low voltage of ±5 V, it was possible to effect clear black/white display. Further, the electrophotographic particles 3e had a response speed which was about several-ten times that of electrophotographic particles used in Comparative Example 2, so that it was confirmed that the electrophoretic display device was capable of being driven at high response speed.

EXAMPLE 7

Particles of carbon black, coated with (sodium styrenesulfonate-styrene) copolymer, prepared in the same manner as in Example 5 was subjected to two-stage polymerization with dodecyl methacrylate to form a core-shell structure wherein a steric hindrance group was introduced into a surface of particle. The particles were then subjected to acid treatment to convert the sodium sulfonate salt into sulfonic acid group.

With 10 g of the thus obtained particles, 0.9 g of a tertiary amine salt represented by a structural formula (D) shown below was caused to react in methanol, followed by separation and purification to obtain electrophotographic particles 3e each having the tertiary amine salt.

Formula (D):

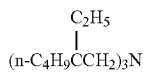

Then, 1 wt. % of the black electrophoretic particles 3e and 99 wt. % of an electrophoretic dispersion medium 3f comprising isoparaffin (trade name: "Isoper H", mfd. by Exxon Corp.) mixed to prepare an electrophoretic dispersion liquid. The electrophoretic dispersion liquid was injected into a cell by using nozzles according to an ink jet method to provide an electrophoretic display device, as shown in FIG. 3(a), which was connected with a voltage application circuit.

As a result of measurement of electric conductivity, it was confirmed that a degree of dissociation of the tertiary ammonium salt of the electrophotographic particles 3e was about 6 times that of an electrifying agent used in Comparative Example 2 appearing hereinafter, thus resulting in an excellent dissociation characteristic.

When the resultant electrophoretic display device was subjected to contrast display by driving it at a low voltage of ±5 V, it was possible to effect clear black/white display. Further, the electrophotographic particles 3e had a response speed which was about several-ten times that of electrophotographic particles used in Comparative Example 2, so that it was confirmed that the electrophoretic display device was capable of being driven at high response speed.

EXAMPLE 8

A plurality of microcapsules 3i each containing an electrophoretic dispersion liquid prepared in the same manner as in Example 7 were prepared by in-situ polymerization method. Each microcapsule was formed of polyamide resin as a film-forming material. An electrophoretic display device shown in FIG. 3(b) was prepared by disposing the plurality of microcapsules 3i on a first substrate 3a by use of nozzles according to the ink jet method. The electrophoretic display device was connected with a voltage application circuit.

As a result of measurement of electric conductivity, it was confirmed that a degree of dissociation of the tertiary ammonium salt of the electrophotographic particles 3e was about 6 times that of an electrifying agent used in Comparative Example 2 appearing hereinafter, thus resulting in an excellent dissociation characteristic.

When the resultant electrophoretic display device was subjected to contrast display by driving it at a low voltage of ±5 V, it was possible to effect clear black/white display. Further, the electrophotographic particles 3e had a response speed which was about several-ten times that of electrophotographic particles used in Comparative Example 2, so that it was confirmed that the electrophoretic display device was capable of being driven at high response speed.

COMPARATIVE EXAMPLE 1

A uniform mixture liquid was prepared by mixing 15 g of titanium oxide particles (average particle size: 0.2 µm) which were subjected to hydrophobicity-imparting treatment and 1.7 g of azobisisobutyronitrile (AIBN) (polymerization initiator) in 137 g of methyl methacrylate. In a dispersion medium comprising 1800 g of a sodium dodecyl sulfonate aqueous solution (concentration: 0.05 wt. %) and 90 g of calcium phosphate dispersed therein, the uniform mixture liquid was added. The resultant liquid was stirred at 10,000 rpm for 15 minutes by a homogenizer to prepare a suspension. Thereafter, the suspension was subjected to polymerization at 80° C. for 7 hours in a nitrogen atmosphere. After the polymerization, the resultant polymer particles were washed, followed by drying and classification to obtain white particles each comprising titanium oxide particle coated with polymethyl methacrylate. An average particle size of the particles was about 2 microns.

Then, 5 wt. % of the white electrophoretic particles, 0.5 wt. % of zirconium octate as an electrifying agent, 2.5 wt. % of styrene-butadiene copolymer as a dispersion stabilizer, and 92 wt. % of an electrophoretic dispersion medium comprising isoparaffin (trade name: "Isoper H", mfd. by Exxon Corp.) colored blue with 0.1 wt. % of a colorant ("Oil Blue N", mfd. by Aldrich Co.) dissolved therein, were mixed to prepare an electrophoretic dispersion liquid. The electrophoretic dispersion liquid was injected into a cell by using nozzles according to an ink jet method to provide an electrophoretic display device, as shown in FIG. 1(a), which was connected with a voltage application circuit.

When the resultant electrophoretic display device was subjected to contrast display by driving it at the same voltage as in Examples 1 to 4, the electrophoretic display device failed to effect-clear blue/white display and achieve high-speed response.

COMPARATIVE EXAMPLE 2

A uniform mixture liquid was prepared by mixing 10 g of carbon black particles (average particle size: 30 nm) which were subjected to hydrophobicity-imparting treatment and 1.7 g of azobisisobutyronitrile (AIBN) (polymerization initiator) in 135 g of styrene. In a dispersion medium comprising 1800 g of a sodium dodecyl sulfonate aqueous solution (concentration: 0.05 wt. %) and 90 g of calcium phosphate dispersed therein, the uniform mixture liquid was added. The resultant liquid was stirred at 10,000 rpm for 15 minutes by a homogenizer to prepare a suspension. Thereafter, the suspension was subjected to polymerization at 80° C. for 7 hours in a nitrogen atmosphere. After the polymerization, the resultant polymer particles were washed, followed by drying and classification to obtain black particles each comprising carbon black particle coated with polystyrene. An average particle size of the particles was about 2 microns.

Then, 1 wt. % of the black particles, 0.1 wt. % of zirconium octate as an electrifying agent, 0.5 wt. % of styrene-butadiene copolymer as a dispersion stabilizer, and 98.4 wt. % of an electrophoretic dispersion medium comprising isoparaffin (trade name: "Isoper H", mfd. by Exxon Corp.) were mixed to prepare an electrophoretic dispersion liquid. The electrophoretic dispersion liquid was injected into a cell by using nozzles according to an ink jet method to provide an electrophoretic display device, as shown in FIG. 3(a), which was connected with a voltage application circuit.

When the resultant electrophoretic display device was subjected to contrast display by driving it at the same voltage as in Examples 5 to 8, the electrophoretic display device failed to effect clear black/white display and achieve high-speed response.

The electrophotographic particles according to the present invention can be utilized in the field of electrophotography or the like using an electrophoretic display device or liquid toner. The salt of the electrophotographic particles of the present invention has an excellent dissociation characteristic in an insulating solvent compared with an acid-base salt or an electrifying used, so that a charging performance is improved. As a result, it becomes possible to provide a considerably higher response speed of the electrophotographic particles than conventional electrophotographic particles. By using the electrophotographic particles capable of effecting high-speed response, it is possible to realize an excellent electrophoretic display device or electrophotographic apparatus.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 117860/2004 filed Apr. 13, 2004, which is hereby incorporated by reference.

What is claimed is:

1. Electrophoretic particles, each of which has a salt at a surface thereof, said salt comprising an acid-derived anionic group and any one of cationic compounds represented by the following formulas (1) to (4):

Formula (1):

wherein R1 and R2 independently denote a linear or branched alkyl group having 1-18 carbon atoms;

Formula (2):

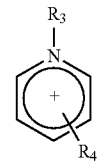

wherein R3 denotes a linear or branched alkyl group having 4-18 carbon atoms, and R4 denotes a linear or branched alkyl group having 1-18 carbon atoms;

Formula (3):

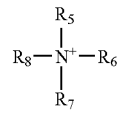

wherein R5, R6, R7 and R8 independently denote a linear or branched alkyl group having 6-18 carbon atoms; and Formula (4):

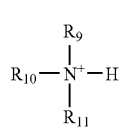

wherein R9, R10 and R11 independently denote a linear or branched alkyl group having 4-18 carbon atoms.

2. An electrophoretic dispersion liquid, comprising:
electrophotographic particles according to claim 1, and
an electrophoretic dispersion medium in which said electrophotographic particles are dispersed.

3. An electrophoretic display device, comprising:
a pair of substrates, and
an electrophoretic dispersion liquid, according to claim 2, disposed between said pair of substratres.

* * * * *